March 23, 1971  SEITOKU KUBO  3,572,178
HYDRAULIC CONTROL SYSTEM OF AN AUTOMATIC TRANSMISSION
Filed May 9, 1969  4 Sheets-Sheet 1

INVENTOR
Seitoku Kubo

BY George B. Anyock
ATTORNEY ent Office 3,572,178
Patented Mar. 23, 1971

3,572,178
HYDRAULIC CONTROL SYSTEM OF AN
AUTOMATIC TRANSMISSION
Seitoku Kubo, Toyota-shi, Japan, assignor to Toyota
Jidosha Kogyo Kabushiki Kaisha, Toyota-shi, Japan
Filed May 9, 1969, Ser. No. 823,382
Claims priority, application Japan, May 18, 1968,
43/33,414
Int. Cl. B60k 23/00
U.S. Cl. 74—868
2 Claims

ABSTRACT OF THE DISCLOSURE

A change-over valve is provided responsive at one end thereof to an oil pressure proportional to engine throttle opening and at the other end thereof to an oil pressure proportional to actual car speed, the latter oil pressure being derived from a governor on the planetary output shaft. Under conditions of low car speed and high torque demand the throttle pressure is effective to move the change-over valve to the left thereby communicating the oil line supply pressure to a pressure regulator valve chamber thereby causing the pressure regulator valve to increase the oil line pressure supplied to the hydraulically operated clutches, brake bands, etc. As car speed increases, the governor pressure overcomes the throttle pressure and moves the change-over valve back toward the right. This causes the oil line pressure to exhaust from the aforementioned regulator valve chamber thereby decreasing the oil line pressure supplied to the various hydraulically operated clutches, brake bands, etc. Operation of the manual valve from the DRIVE position to the LOW position is effective to render the change-over valve responsive to the oil line pressure rather than the throttle opening pressure.

BRIEF SUMMARY OF THE INVENTION

The present invention relates generally to automatic transmissions as used, for example, in automobiles and the like, and more specifically to the hydraulic control system for controlling such transmissions.

In a typical automatic transmission there is usually provided a torque converter or fluid coupling together with a speed changing unit such as a planetary gearset for effecting the desired gear reductions or torque ratios. Ordinarily, two or three forward speeds and one reverse may be obtaind by simultaneously locking or engaging various elements of the planetary system. These elements which usually take the form of hydraulically operated disk clutches, brake bands and the like are regulated automatically by the transmissions' hydraulic control system which in response to various operating conditions (e.g., car speed, engine throttle opening, etc.) directs suitable oil pressures to the various elements for release or application as the situation may require. For example, a very common automatic upshift is to apply a disk clutch across two members of a planetary gearset and release brake band holding the planetary sun gear in response to movement of a shift valve in the hydraulic control system which shift valve is sensitive to the output of a governor and/or the opening of the engine throttle. Alternatively, the various speed reduction ranges may be selected manually by the driver via mechanical movement of the manual valve or gear shift lever, which acting through the control system directs oil pressure to the necessary elements directly, and directly exhausts those units not involved.

One problem affecting the operation of such hydraulic control systems is the need to precisely control the pressure characteristic of the hydraulic actuating supply since the amount of work done by these units is a function of the engine torque. Thus, in the low speed range where there is large torque multiplication in the torque converter the oil line pressure should be maintained at a high constant level so as to provide sufficient engaging power for the clutch units and brake bands involved. Conversely, in the high speed range where torque demand decreases, the oil line pressure should be stepped down from a high constant level to a lower, albeit still constant level to minimize oil pumping losses.

Thus, in view of the foregoing, it is a principal object of the present invention to provide a hydraulic control system for automatic transmissions having means for developing high level constant oil line pressures at torques higher than a predetermined torque demand and develop low level constant oil line pressure at torques lower than the predetermined torque demand.

Toward the accomplishment of these and other objects and advantages there is disclosed below a hydraulic control system for automatic transmissions having a first valve means responsive to governor pressure and throttle opening pressure and being adapted in a first position thereof to supply oil under pressure to a pressure regulator valve, said first valve being further adapted in a second position thereof to exhaust said oil under pressure to said pressure regulator valve.

Additional objects and advantages as well as a full understanding of the present invention will be made apparent from a study of the following detailed description of the invention in connection with the accompanying drawings wherein:

DETAILED DESCRIPTION OF THE INVENTION

Figure 1:
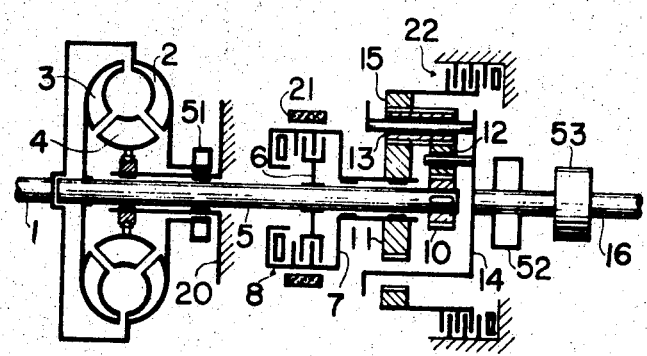
FIG. 1 is a schematic representation of one form of automatic transmission to which the hydraulic control system of the present invention is applicable.

Turning now to FIG. 1, there is shown a schematic representation of one form of automatic transmission having two forward speeds and one reverse speed. In the torque converter portion which may be of a known three element-one stage type of the transmission an impeller 2 directly connected to an input shaft, transmits engine torque to a turbine 3 by circulating oil through the blades of the turbine and thence through the blades of a reactor 4 connected through an overrunning clutch means to the frame of the converter housing. The blades of the reactor are arranged to deflect the oil flow redirecting it back into the impeller. Thus, so long as the impeller is driven by the input shaft 1, the flow of oil is maintained and torque is continuously transferred to the turbine shaft 5.

The turbine torque thus taken out is transmitted to a speed reduction unit which, in its preferred form, comprises a conventional planetary gear set coupled to the other end of shaft 5. That is, the shaft 5 has secured directly to it the sun gear 10 of the planetary and thus serves as the input shaft therefor. Also connected to the shaft 5 is the hub 6 of a clutch assembly 8. The planetary's low sun gear 11 is integral with the drum 7 of clutch assembly 8 to form a unitary structure rotatably supported on shaft 5 in cooperative engagement with the clutch hub 6 through a series of multiple clutch plates. Thus, when clutch assembly 8 is engaged, the low sun gear rotates with shaft 5 as a single body. Planetary pinions 12 and 13 are meshed with each other and are supported by a planetary carrier 14 integral with the gear sets' output shaft 16. Ring gear 15 is driven by sun gear 10 through pinions 12 and 13, or additionally by low sun gear 11 through pinion 13 when clutch assembly 8 is engaged. Also, a brake band 21 is provided for selective frictional engagement with the outer periphery of clutch drum 7 when actuated by suitable hydraulic servo means. Finally, a rear clutch 22 is provided for selectively locking the ring gear 15 to the main casing of the planetary gear set.

In accordance with the present invention, automatic hydraulic servo control means are provided for selectively actuating clutches 8, 22 and brake bands 21 to effect the desired gear reductions in the planetary gear set necessary to provide for two forward speeds and one reverse speed as will be more fully explained below. Suffice it to say merely at this point that the first forward speed reduction is accomplished by engaging the brake band 21 relative to clutch drum 7 and simultaneously releasing clutch assembly 8 so that the turbine shaft 5 rotates relative to low sun gear 11. To obtain the second forward speed reduction, the brake band 21 is released and clutch 8 is engaged thereby locking up the planetary and establishing a direct drive between the turbine shaft and the output shaft 16. Finally, to obtain the reverse speed reduction, the brake bands 21 and clutch assembly 8 are each disengaged while the rear clutch 22 is engaged to effectively fix the ring gear 15 to the gear set's casing thereby preventing it from rotating. This reverses the rotation of the output shaft 16 and this provides the reverse speed reduction. The operation of the various clutches and brake bands in each speed range is conveniently summarized in the following table where LOW gear represents the first speed reduction and HIGH gear the second speed reduction.

TABLE I

| | Clutch 8 | Brake band 21 | Clutch 22 |
|---|---|---|---|
| LOW gear | Out | In | Out |
| HIGH gear | In | Out | Out |
| REVERSE gear | Out | Out | In |

Figure 2:
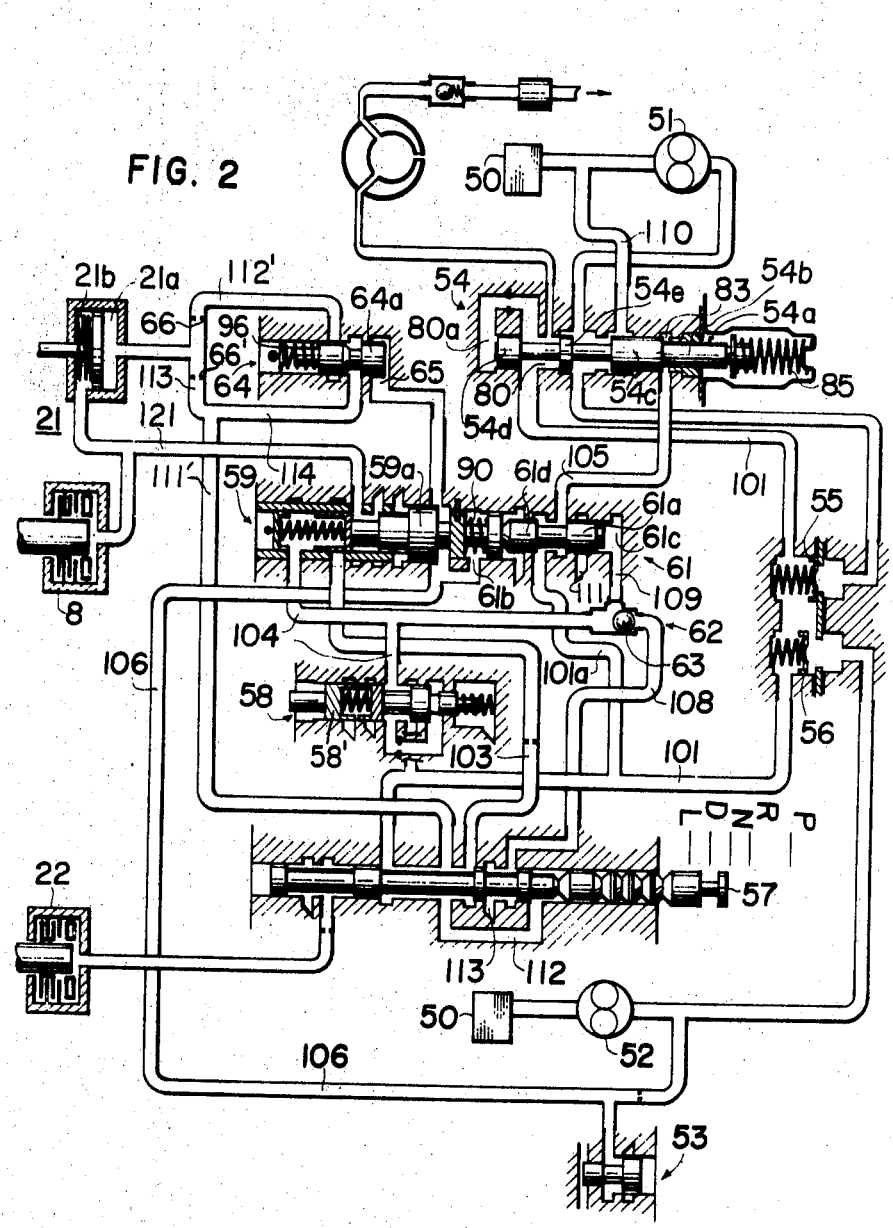
FIGS. 2 to 4 are hydraulic diagrams illustrating the operation of the hydraulic control system of the present invention when the manual valve is in the DRIVE range position (FIGS. 2 and 3) and when the manual valve is in LOW range position (FIG. 4); and, FIG. 5 is a diagram graphically illustrating the oil line pressure control characteristic obtainable with the hydraulic control system of the present invention.
Figure 3:
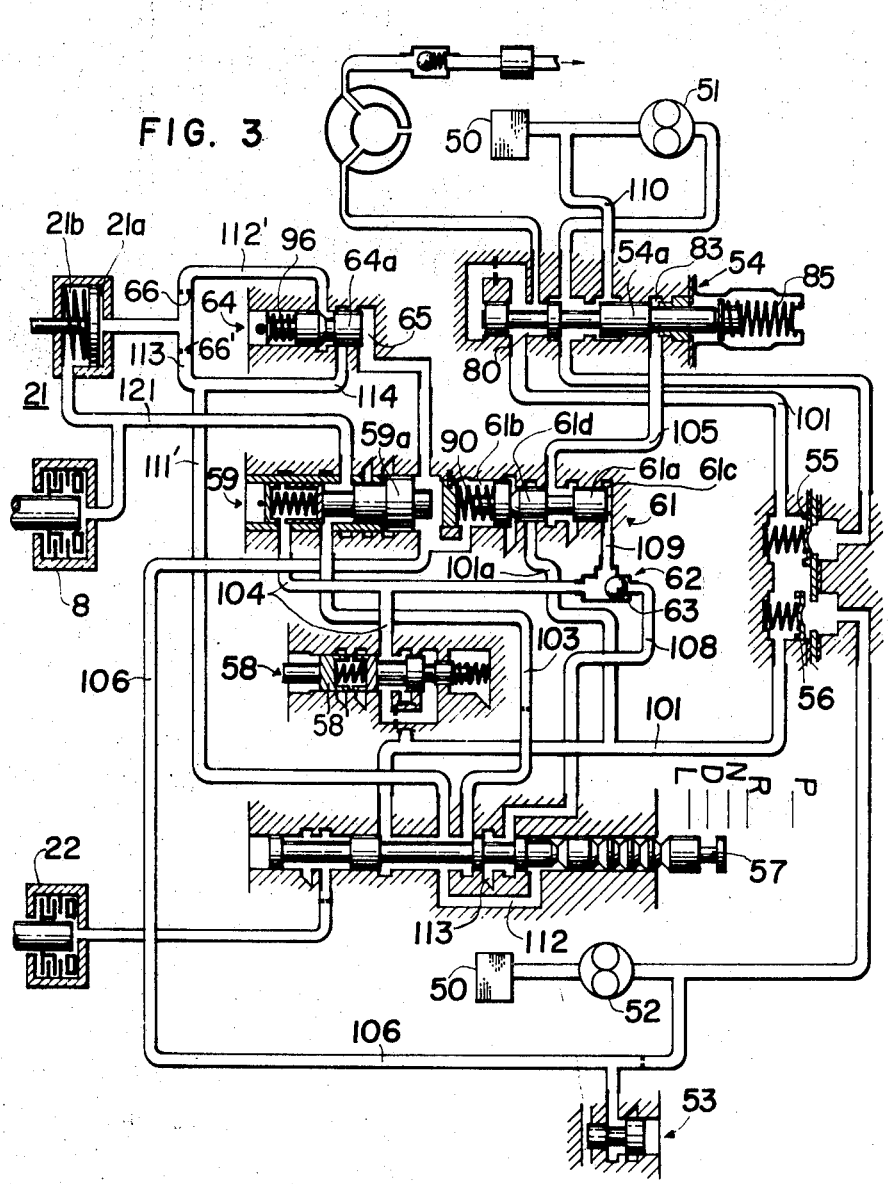
Figure 4:
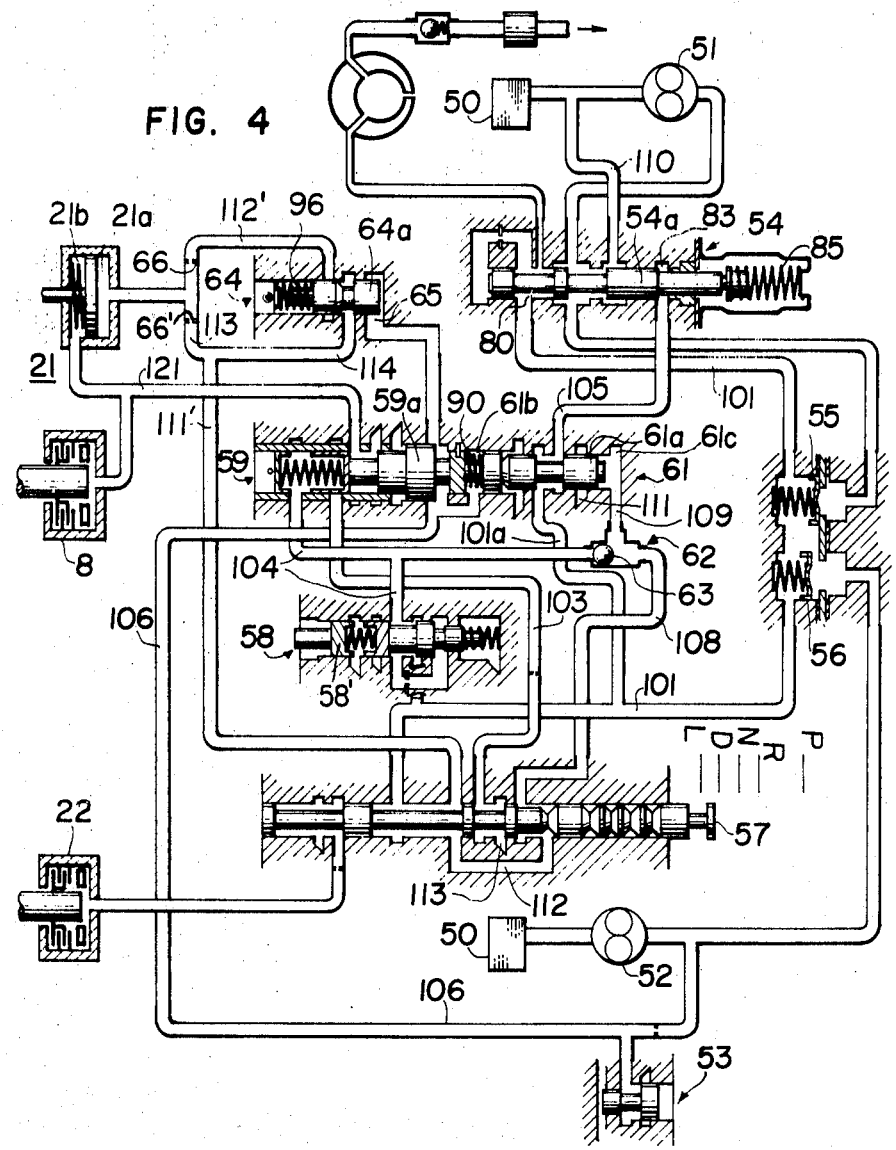

Turning now to FIGS. 2-4 the hydraulic control system for selectively acuating the above mentioned clutches 8, 22 and brake bands 21 so as to effect automatically, the desired speed changes between LOW gear and HIGH gear will now be described.

A front oil pump 51 which is directly driven by the engine through the impeller 2 and a rear oil pump 52 driven by the output shaft 16 (see FIG. 1) supplies hydraulic fluid or oil under a pressure PL to the line pressure passage 101 through check valves 55, 56. The oil pressure PL in this line is regulated by a pressure regulator valve 54 as will be more fully explained below, and is transmitted to a throttle valve 58. The oil line pressure PL is also transmitted to a line 103 through manual valve 57 when the latter is in its drive range or D position. Of course, it will be appreciated that the manual valve is suitably adapted to be directly actuated by the automobile driver through a gear shift select lever or the like mounted at or near the driver's station. The opening of the engine throttle and therefore the engine torque is sensed by the displacement of a plug 58 member in the abovementioned throttle valve 58 and an oil pressure proportional to this displacement is produced in the line 104. This oil pressure therefore will be referred to hereinbelow as the throttle pressure $P_{th}$. In a similar manner, governor 53 driven by the output shaft 16 (FIG. 1) senses the car's actual speed and supplies an oil pressure proportional thereto to the line 106. This oil pressure will thus be referred to herein as the governor pressure $P_{go}$.

In accordance with the present invention the reduction ratio of the planetary gear set is varied by actuation of a shift valve or speed change valve 59 in response to the aforementioned throttle pressure $P_{th}$ and governor pressure $P_{go}$. For example, when manual valve 57 is in its "D" position, the line pressure PL is also supplied through valve 57 to a pressure line 111' communicating with the front brake bands 21 such that the oil line pressure acts on the working side 21a of the servo piston of brake band 21. In the absence of oil pressure in line 121, the brake band 21 is engaged and the clutch assembly 8 released thus establishing the first speed LOW gear as indicated above in Table I. However, when the car attains an actual speed equivalent to its engine throttle opening, the governor pressure $P_{go}$ in line 106 acts upon the right side of shift valve 59 and moves it to the left to thereby communicate the pressure line 103 with the pressure line 121. The line pressure PL in line 121 thus acts to engage the clutch assembly 8 while at the same time acts on the release side 21b of the brake band servo piston to thereby release the brake band 21. As previously mentioned, actuation of clutch assembly 8 in this manner locks up the planetary gear set directly coupling the turbine shaft to the output shaft to thereby establish the second speed HIGH gear as listed in Table I. Obviously, downshifting from HIGH to LOW gear may be accomplished by simply releasing the oil pressure in line 121 via actuation of shift valve 59 back toward the right. This may happen, for example, when the governor pressure $P_{go}$ decreases in line 106 in response to a decrease in actual car speed.

In line 111' from the manual valve 57 to the chamber 21a of the brake band 21 there is provided an orifice control valve 64, whose right chamber 65 is applied with the governor pressure and whose left end engages a biasing spring 96. The line 111' branches off before the orifice control valve 64 into two lines 113 and 114, the latter of which is communicated with the valve 64. A line 112', which is an output line of the valve 64, has an orifice 66, and the line 113 has an orifice 66' therein. The orifice control valve 64, controlled by the governor pressure, makes or breaks the connection between the lines 114 and 112' so that the flow from the line 112' to the chamber 21a of the front brake band 21 is controlled. Thus, upon downshift from high gear to low gear, the flow to the brake band 21, and therefore, the timing of engagement of the band 21 can be controlled in dependence on the vehicle speed. This permits a smooth downshift from high gear to low gear.

It is an important feature of the present invention to provide a predetermined control characteristic for the above described servo oil pressures through utilization of a pair of valve means namely, pressure regulator valve 54 and change-over valve 61. The operation of these valves is as follows. Since the line pressure passage 101 is branched, the line pressure PL is supplied to the pressure regulator valve 54 through the branch lines 101a and 105 with the change-over valve 61 being interposed therebetween. The change-over valve 61 includes a coil spring 90 mounted on the left end thereof, the spring force of which acts on valve spool 61a tending to move it to the right. At the same time, the governor pressure $P_{go}$ in line 106, which it will be recalled is produced in response to the car's speed, is being applied in the valve chamber 61b at the left end of the valve; hence, the governor pressure $P_{go}$ also acts on the valve spool 61a tending to move it to the right. However, due to the valve chamber 61c being at the right end of the valve, either the throttle pressure $P_{th}$ of line 104 (produced in response to the opening of the car engine throttle) or the line pressure PL of line 108 acts on spool 61a tending to drive it to the left. It will also be noted that the line pressure PL communicates with valve chamber 61c through manual valve 57, line 108, and check valve unit 62. Thus it will be appreciated that the change-over valve is controlled to move to the left by either the throttle pressure $P_{th}$ or the line pressure PL acting on spool 61a, or to the right in response to the governor pressure Pgo and the spring force of coil spring 90 acting on the spool 61a. Of the above, the spring force of coil spring 90 tending to move spool 61a to the right is set in advance to always remain constant; therefore the change-over valve 61 works only in response to variations in either the throttle pressure Pth or the line pressure PL and the governor pressure Pgo.

Now, when the throttle pressure Pth has acted on the valve chamber 61c at the right end of change over valve 61 by selective operation of the check ball unit 62, the valve spool 61a of said change over valve 61 operates according to the pressure change of said throttle pressure Pth and governor pressure Pgo and if the effect given to the valve 61a by the throttle pressure Pth is greater than that by the governor pressure Pgo at the low speed range, the valve 61a moves to the left thereby communicating the line 101a with the line 105. Thus the line pressure PL of line 101a is applied to the pressure regulator valve 54 through the line 105. On the other hand, if the effect by the governor pressure Pgo becomes greater than that corresponding to the throttle pressure Pth owing to an increase in car speed, the valve spool 61a of change over valve 61 moves in the right direction as shown in FIG. 3, this causes the line 105 to be shut off from the line 101a by the action of valve land 61d which instead communicates line 105 with the exhaust port 111, thereby relieving the pressure of line 105 through the exhaust port 111.

Consider now what happens when the line pressure PL has acted on the chamber 61c at the right end of change over valve 61 by selective operation of the check ball unit 62. In this situation, the valve spool 61a of said change over valve 61 operates according to the pressure change of said line pressure PL and the throttle pressure Pth. However, the line pressure PL acting on the valve chamber 61c is a constant pressure, therefore the valve spool 61a operates only according to the pressure change of governor pressure Pgo and in a manner similar to that described above the pressure line 105 is communicated to the pressure line 101a or communicated to the exhaust port 111 by left-ward and right-ward movement of said valve spool 61a, respectively.

As mentioned above, the pressure regulator valve 54 is to regulate the line pressure PL supplied to clutches 8, 22 and brake bands 21. Chambers 80, 80a at the left side of valve spool 54a receive oil pressure from oil pumps 51 and 52 through the line 101. At the right end of valve spool 54a, there is provided a coil spring 85 and a chamber 83 into which the oil pressure of line 105 is to be supplied. Thus, the valve spool 54a may be controlled to move either in the left or in the right direction by oil pressure acting on land 54d from chamber 80a at the left end, the spring force of coil spring 85 at the right side and the oil pressure acting on chamber 83.

The effect of the manual valve 57 in each of its respective speed gear positions on the hydraulic control circuits of the change over valve 61 and the pressure regulator valve 54 as explained above will now be described.

Consider first the hydraulic operating conditions which obtain when the manual valve 57 is in the DRIVE range position as shown, for example, in FIGS. 2 and 3. Since the line pressure PL of line 108 is relieved through the relief vent 113 at manual valve under said condition, the line 108 receives no pressure and the check ball 63 of check ball unit 62 is urged by the throttle pressure Pth of line 104 to move to its right-most position, thereby shutting off line 108 and opening line 104. The throttle pressure Pth in line 109 is therefore conducted to the valve chamber 61c to act upon the valve spool 61a. Change-over valve 61 is thus controlled by the throttle pressure Pth conducted to said valve chamber 61c and the governor pressure Pgo conducted to the valve chamber 61b. Now, let it be assumed that a condition of low car speed exists and that the valve spool 61a of change-over valve 61 is in the left position so that line pressure PL is supplied in line 105, said line pressure PL being applied to the chamber 83 at the right side of pressure regulator valve 54 to act on the valve spool 54a and to move the spool 54a in the left direction, this causes the oil in chamber 80 at the left side of valve 54 to produce a pressure corresponding to said left directional force (this is the so-called line pressure) which is then supplied to the required clutches and brake bands from the line 101. Further, the line pressure PL produced in the pressure regulator valve under such conditions becomes a constant high pressure PLH which is determined by a difference of area between the lands 54c and 54b, and the area of land 54d (the line pressure is acting on either land) and also the spring force of coil spring 85. The hydraulic diagram for this condition is shown in FIG. 2 and the pressure diagram is shown by the condition in the comparatively low car speed section of FIG. 5.

Figure 5:
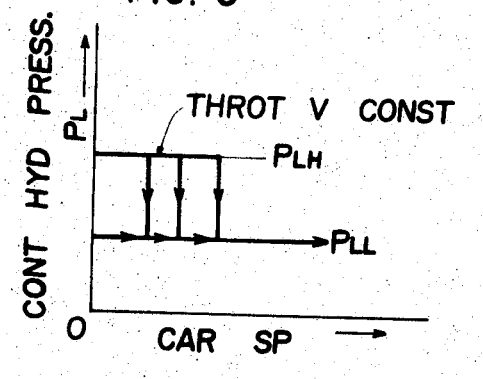

When the valve spool 61a of change-over valve 61 has moved toward the right to communicate the line 105 to exhaust port 111 (as shown in FIG. 3) with the increase of car speed, the oil pressure in the chamber 83 of pressure regulator valve 54 is relieved through the lines 105, 111, so that the line pressure PL comes down to a constant low pressure PLL which is to be determined by the area of land 54d and the spring force of coil spring 85. The pressure diagram in this condition is shown by the higher car speed section in FIG. 5. As explained above, the line pressure PL in the drive range condition of manual valve 57, as shown in FIG. 5, changes in steps from the constant high line pressure PLH at the low car speed to the constant low line pressure PLL according to increase of the speeds, however the speed positions on which this high line pressure PLH steps down to the low line pressure PLL are different depending upon the opening of engine throttle valve. That is, when the opening of the engine throttle is small, the throttle pressure Pth produced by the throttle valve 58 is small therefore the valve spool 61a of change-over valve 61 moves in the right direction even when acted upon by a comparatively small governor pressure Pgo produced at a comparatively low car speed. Thus, when the opening of the engine throttle is small the pressure PL changes in steps at comparatively low car speed. However, as the opening of the engine throttle increases, the throttle pressure Pth produced by the throttle valve 58 also gradually increases, therefore the valve spool 61a of change-over valve 61 can not move in the right direction unless the higher governor pressure Pgo is applied to said valve spool 61a, thus the speed position on which the line pressure PL changes in steps according to increase of the opening of engine throttle valve also gradually shifts to the higher speed. Hence, according to the hydraulic control of this invention, because of the change-over valve 61 being added with the element of throttle pressure Pth, the speed positions where the line pressure PL steps up or down vary depending upon the opening of the engine throttle; that is, when the opening of the engine throttle is small it changes at the comparatively low car speed, while when becoming larger it changes at the comparatively high car speed.

Turning now to FIG. 4, the effects on the hydraulic operating conditions which obtain when the manual valve is in the LOW range position will now be described. Inasmuch as the line pressure of line 101 is now supplied to the line 108 through the line 112, the ball 63 of check ball unit 62 in said line 108 is moved to its left-most position due to the line pressure PL overcoming the throttle pressure Pth of line 104. As a result, line 104 is shut off and line 108 is opened. The line pressure PL of line 108 is then supplied to line 109 and finally conducted to the valve chamber 61c. The valve spool 61a of change-over valve 61 is thus controlled by the line pressure PL conducted in said chamber 61c and the governor pressure Pgo conducted into the valve chamber 61b. Further, since this line pressure PL is always maintained at a higher pressure than the throttle pressure Pth, the ball 63 of check ball unit 62 always maintains its position in the left-most condition shown. Therefore, in the LOW range, the valve spool 61a of change-over valve 61 moves in either the right or left direction by action of the line pressure PL and the governor pressure Pgo to make the line 101a communicate with or shut off from the line 105 and to supply the line pressure PL of line 101a to the valve chamber 83 of pressure regulator valve 54 or relieve said line pressure PL outside. Thus the predeterminate line pressure change is to be obtained by the same control as in the foregoing DRIVE range; however, the characteristic diagram of the line pressure PL when stepping down from the high line pressure PLH to the low line pressure PLL according to the increase of car speed in this LOW range becomes identical with the characteristic diagram in case of the full opening of engine throttle in the previous DRIVE range in the present embodiment of the invention. That is, the throttle pressure Pth taken out to the line 104 is the pressure that the line pressure PL of line 101 is controlled by the throttle valve 58 corresponding to the opening of the engine throttle, however, at the time of full opening of the engine throttle the line pressure PL of line 101 is taken out to the line 104 without any control by this throttle valve 58, therefore the throttle pressure Pth at this time becomes equal to the line pressure PL.

Now, at LOW range when reducing the speed after the line pressure has reached the low line pressure PLL by initially increasing the speed, the speed position in which the line pressure steps up from the low line pressure PL to the high line pressure PLH according to decrease of the car speed becomes lower than the speed position in the case of stepping down from the high line pressure PLH to the low line pressure PLL. The reason for this is that the line pressure PL conducted into the valve chamber 61c of change-over valve 61 under such condition is the low line pressure PLL, so that the valve spool 61a of change-over valve 61 does not move leftwards unless the governor pressure Pgo supplied to the valve chamber 61b comes down to the pressure equivalent of the above low line pressure PLL. That is, there is produced a difference in the car speed position between both cases when changing from the high line pressure PLH to the low line pressure PLL and when changing from the low line PLL to the high line pressure PLH. The change of line pressure in the LOW range of manual valve 57 is as previously explained, however the line pressure PL conducted in the valve chamber 61c of change-over valve 61 in this LOW range is either the high line pressure PLH or the low line pressure PLL, which is a constant pressure, so that the car speed positions in which the oil pressure changes in steps are to be limited to two definite car speed positions.

It will now be appreciated that the hydraulic control characteristics obtained in accordance with the present invention permits an increased line pressure PL, and consequently increased torque, to be applied to the hydraulic servo unit containing the various clutches and brake bands thereby establishing more efficient engaging power particularly in the low speed range where the torque converter approaches a stall condition. On the other hand, in the high speed range where the torque converter approaches the condition of a pure fluid coupler, a low constant line pressure PL is supplied to the servo unit thereby minimizing the power losses due to the oil pumps.

Thus, by employment of the foregoing control system, the problem of slipping clutches and brake bands due to a shortage of engaging power in the hydraulic servo unit when there is a sudden torque demand at small engine throttle openings is completely overcome and results in improved car acceleration, and greater durability with respect to the various clutches and brake bands. In addition, because the line pressure PL is controlled by the change over valve as disclosed above, oil pressure is made more stable without losses due to hysteresis and can be controlled more accurately than in the prior modulator systems.

It is to be observed therefore that the present invention has fully disclosed above a hydraulic control apparatus for use in vehicle having an automatic transmission, said control apparatus including an oil line pressure supply, a plurality of hydraulically operated servo units, and means for directing said oil line pressure from said supply to said servo units, said apparatus further comprising means responsive to the engine of said vehicle for producing an oil pressure proportional to the throttle opening thereof, governor means responsive to the speed of said vehicle for producing an oil pressure proportional thereto and means responsive to the changing conditions of said throttle opening oil pressure and said governor oil pressure for varying in a predetermined characteristic manner the pressure of said oil line pressure supply directed to said hydraulic servo units.

I claim:

1. A fluid control apparatus for use with a vehicle having a throttle, and an automatic transmission, comprising in combination:

(a) at least one friction engagement means having a fluid pressure operated servo unit for engaging vehicle moving parts;

(b) a fluid pressure control system having throttle valve means for producing a throttle pressure in proportion to the throttle opening of the engine, governor means for producing a governor pressure in proportion to the vehicle speed, a fluid pressure source, a shift valve assembly having a pressure relay means with a valve member movably responsive to a first position in response to said throttle pressure and movably responsive to a second position in response to said governor pressure and biasing means urging said valve member into said second position, a pressure regulator valve operative to regulate the magnitude of the output pressure of said source, passage means interconnecting said pressure regulator valve and said servo units;

(c) a fluid pressure area on said pressure regulator valve; and, (d) conduit means communicating with said fluid pressure area, said pressure relay means in the first position communicating said conduit means with said output passage from said pressure regulator valve, while in the second position it interrupts said connection so that the magnitude of fluid pressure supplied to the servo unit is established at a high constant regulated pressure during operation of said vehicle at a high torque and is stepped down to a lower constant regulated pressure at a low torque and high vehicle speeds.

2. A fluid control apparatus for use with a vehicle having a throttle, and an automatic transmission, comprising in combination:

(a) at least one friction engagement means having a fluid pressure operated servo unit, for engaging vehicle moving parts;

(b) a fluid pressure control system having throttle valve means for producing a throttle pressure in proportion to the throttle opening of the engine, governor means for producing a governor pressure in proportion to the vehicle speed, a fluid pressure source, a shift valve assembly having a pressure relay means with a valve member movably responsive to a first position in response to said throttle pressure and movably responsive to a second position in response to said governor pressure and biasing means urging said valve member into said second position, a pressure regulator valve operative to regulate the magnitude of the output pressure of said source, passage means interconnecting said pressure regulator valve and said servo units;

(c) a fluid pressure area on said pressure regulator valve;

(d) conduit means communicating with said fluid pressure area, said pressure relay means in the first position communicating said conduit means with said output passage from said pressure regulator valve, while in the second position it interrupts said connection so that the magnitude of fluid pressure supplied to the servo unit is established at a high constant regulated pressure during operation of said vehicle at a high torque and is stepped down to a lower constant regulated pressure at a low torque and high vehicle speeds; and, (e) manual valve means interposed in the path of said fluid pressure source and said shift valve assembly, being movably operative between a DRIVE position and a LOW position, conduit means extending between said manual valve means and said shift valve assembly, including therebetween a check-ball unit operatively responsive to said throttle opening fluid pressure when said manual valve is in the DRIVE position, said check-ball unit being operatively responsive to convey said fluid pressure along said conduit to said shift valve assembly for actuation thereof in lieu of said throttle valve pressure when said manual valve is movably operated to its LOW position.

References Cited

UNITED STATES PATENTS

| | | | |
|---|---|---|---|
| 3,022,676 | 2/1962 | Duffy | 74—868 |
| 3,085,449 | 4/1963 | De Corte et al. | 74—H.C.S. 1 |
| 3,095,755 | 7/1963 | Duffy | 74—H.C.S. 1 |
| 3,233,478 | 2/1966 | General et al. | 74—763 |
| 3,354,752 | 11/1967 | General et al. | 74—763 |

C. J. HUSAR, Primary Examiner